(12) United States Patent
Sherik et al.

(10) Patent No.: US 11,549,877 B2
(45) Date of Patent: Jan. 10, 2023

(54) LABORATORY APPARATUS AND METHOD TO MEASURE BLACK POWDER PARTICLE DISLODGMENT AND ENTRAINMENT VELOCITIES AND SOLIDS LOADING

(71) Applicant: Saudi Arabian Oil Company, Dhahran (SA)

(72) Inventors: Abdelmounam Sherik, Dhahran (SA); Ehab Elsaadawy, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 357 days.

(21) Appl. No.: 16/991,881

(22) Filed: Aug. 12, 2020

(65) Prior Publication Data
US 2022/0050040 A1    Feb. 17, 2022

(51) Int. Cl.
*G01N 15/06* (2006.01)
*B01L 3/00* (2006.01)
*G01N 15/00* (2006.01)

(52) U.S. Cl.
CPC .......... *G01N 15/06* (2013.01); *B01L 3/50273* (2013.01); *G01N 2015/0003* (2013.01); *G01N 2015/0046* (2013.01)

(58) Field of Classification Search
CPC .......... G01N 15/06; G01N 2015/0003; G01N 2015/0046; G01N 15/0826; B01L 3/50273
See application file for complete search history.

(56) References Cited

U.S. PATENT DOCUMENTS

| | | | |
|---|---|---|---|
| 3,261,199 A | 7/1966 | Raynor | |
| 3,473,388 A | 10/1969 | Lynn | |
| 6,399,390 B1 | 4/2002 | Kantzas et al. | |
| 10,481,059 B2 * | 11/2019 | Burns | G01N 15/0618 |
| 10,648,891 B2 * | 5/2020 | He | G06Q 10/20 |

(Continued)

FOREIGN PATENT DOCUMENTS

| | | |
|---|---|---|
| CN | 102230943 B | 7/2012 |
| CN | 105181571 A | 12/2015 |

OTHER PUBLICATIONS

International Search Report and Written Opinion in corresponding PCT Application No. PCT/US21/45559; dated Nov. 29, 2021; 13 pages.

(Continued)

*Primary Examiner* — David Z Huang
(74) *Attorney, Agent, or Firm* — Leason Ellis LLP (57) ABSTRACT

An apparatus for measuring black powder dislodgment and entrainment velocities. The apparatus comprises an inlet section including a first gas source having a test gas, a second source having an additional gas, and an inlet pipe coupled to the first and second gas sources, a plenum having an inlet plate coupled to the inlet pipe for receiving the test gas or the additional gas and distributing the received gas into a steady flow, and a plurality of test sections extending from the plenum, each test section including a particle generation spool at which black powder is generated from the test gas via a condensation process, and a filtration spool downstream from the particle generation spool having at least one membrane element for filtering out black powder from the test gas flow and also having pressure gauges from which black powder dislodgment and entrainment velocities can be determined.

20 Claims, 3 Drawing Sheets

Fig. 1

(56) References Cited

U.S. PATENT DOCUMENTS

2016/0258876 A1   9/2016   Al Hosani et al.
2018/0067032 A1   3/2018   Burns et al.
2018/0259426 A1   9/2018   He et al.

OTHER PUBLICATIONS

Smart, John. "Dr. John Smart III, Inline Services Inc., USA, Talks about Calculating Velocity for Solid Particle Movement in Oil and Gas Pipelines." Dec. 2009. 1-5.

* cited by examiner

LABORATORY APPARATUS AND METHOD TO MEASURE BLACK POWDER PARTICLE DISLODGMENT AND ENTRAINMENT VELOCITIES AND SOLIDS LOADING

FIELD OF THE DISCLOSURE

The present disclosure concerns the oil and gas industry, and in particularly relates to a laboratory apparatus and method to measure flow parameters of black powder particles which tend to accumulate in gas pipelines. The laboratory testing apparatus and method measures black powder entrainment velocities and solids loading.

BACKGROUND OF THE DISCLOSURE

In the gas industry, the term "black powder" describes material that collects in gas pipelines having a black or near-black color. The black powder is composed of various forms of iron sulfide, iron oxide and iron carbonate, mechanically mixed or chemically combined with various contaminates such as elemental sulfur, salts, sand, clay, silt, metal debris, liquid hydrocarbons, etc. These products are formed inside natural gas pipelines as a result of corrosion of the internal walls of the pipeline by reactions of iron (Fe) present in ferrous pipeline steel with water containing oxygen ($O_2$), hydrogen sulfide ($H_2S$) and carbon dioxide ($CO_2$). Black powder formed in pipelines can be "wet" with a tar-like or sludge-like texture, or "dry" in the form of fine powder. The powder products tend to have a high density (e.g., approximately 4 to 5.1 $g/cm^3$), and are abrasive and difficult to remove in cleaning operations, particularly when wet (for example, mixed with TEG and/or compressor oil).

Black powder particles, particularly when they start to move, can have a number of adverse impacts on pipeline operations and product quality. For example, black powder particles can present major health and environmental hazards, can cause under-deposit pitting corrosion of pipelines, trigger erosion and/or clogging of control valves and metering instrumentation, delay inspection runs and reduce the accuracy of the inspection data, reduce the flow rates in the gas transmission pipelines, lower compressor efficiency, and impact customer operations and product quality in numerous ways. These together lead to significant increases in costs.

Case histories have shown that large quantities of black powder can be generated inside pipelines. Over a period of years, hundreds of thousands of kilograms of black powder can accumulate at pipeline filter stations. The need to manage such black powder cost accumulation can add millions of dollars in operating expenditures including repair & maintenance of control valves, pipeline cleaning, handling and disposal of black powder, as well as require much more in capital expenditures including installation of new filters, etc.

As alluded to above, it is when black powder particles move due to fluid velocity that they become particularly problematic. Therefore, knowledge of the dislodgment and entrainment velocities of black powder solids can significantly assist gas operators in designing the proper filtration systems and in providing advance warning to downstream operations of incoming black powder particles.

SUMMARY OF THE DISCLOSURE

The present disclosure describes an apparatus for measuring black powder dislodgment and entrainment velocities. The apparatus comprises an inlet section including a first gas source having a test gas, a second source having an additional gas, and an inlet pipe coupled to both the first and second gas sources, a plenum having an inlet plate coupled to the inlet pipe for receiving delivery of at least one of the test gas and the additional gas and distributing the received gas into a steady flow, and a plurality of test sections coupled to and extending from the plenum, each of the test sections including a particle generation spool at which black powder is generated from a flow of the test gas via a condensation process, and a filtration spool positioned downstream from the particle generation spool having at least one membrane element for filtering out black powder from the flow of the test gas, the filtration spool also having pressure gauges positioned at opposite ends of the spool from which black powder dislodgment and entrainment velocities can be determined.

In certain embodiments, the test gas contains a) at least one of nitrogen and methane and b) at least one of $H_2S$ and $CO_2$. In some implementations, the test gas further contains oxygen. The additional gas can comprise nitrogen.

In certain embodiments, the apparatus further comprises an electronically controllable 3-way valve positioned coupled to outlets of the first and second gas sources and configured to block or permit delivery of gas from either the first or second gas sources.

In certain embodiment, each of the plurality of test sections further comprise an inlet spool permanently affixed to the plenum and coupled between the plenum and the particle generation spool. In some implementations, the particle generation spool and filtration spool in each of the plurality of test sections are removably coupled to the inlet spool.

Each of the plurality of test sections can further include a collection spool positioned at an outlet of the filtration spool.

In some implementations, the plurality of test sections comprises at least three test sections.

The particle generation spool can be formed as a pipe made of a carbon steel material and having internal and external cylindrical surface. In addition, the apparatus can further include a sleeve positioned surrounding the external surface of the particle generation spool of each of the plurality of test sections and a cooling fluid that circulates in an annulus between the sleeve and the particle generation spool, the cooling fluid serving to cool the material of the particle generation spool, inducing water condensation and corrosion on the internal surface of the particle generation spool from reaction between the water condensation, the steel material and the test gas.

Further embodiments of the apparatus include a scrubber arrangement that can be and removably coupled to an outlet of the particle generation spool of a test section, the scrubber arrangement including components for removing hydrogen sulfide from the test gas before venting to a surrounding environment.

Each of the plurality of test sections can formed as a pipe with a differing diameter from others of the plurality of test sections. In addition, each of the at least one membrane element of the filtration spool of the plurality of test sections can have a different pore size.

The present disclosure also provides a method of measuring black powder dislodgment and entrainment velocities. The method comprises delivering a flow of test gas to a plurality of test section pipes in a steady manner to each of the test sections, the test sections each having a particle generation spool, generating black powder in the particle generation spool via a flow of the test gas via a condensation process, stopping flow of the test gas and delivering flow of an additional gas that does not produce corrosion, the flow of the additional gas causing dislodgement and entrainment of the black powder previously generated, filtering the black powder particles in a filtration spool coupled downstream of the particle generation spool in each test section, the filtration spool having at least two membrane elements positioned in series along a length of the spool, measuring pressure difference across ends of the filtration spool, removing and weighing the membrane elements of each filtration spool, and determining, using a configured processor, black powder particle velocity and mass flow from the measured pressure difference across the filtration and weights of the membrane elements.

In certain embodiments, the method further comprises cooling the particle generation spool to promote corrosive condensation of water on an internal surface of the particle generation spool in each test section.

An internal diameter of each of the plurality of test section pipes can be varied, wherein the internal diameter has an effect upon black powder velocity and mass flow. The pore size of the at least two membranes the filtration spool of each of the plurality of test section pipes can also be varied, wherein the membrane pore size has an effect upon black powder velocity and mass flow. The plurality of test section pipes can include at least three test section pipes.

In certain embodiments, the flow of test gas is delivered to the plurality of test section pipes via a plenum.

These and other aspects, features, and advantages can be appreciated from the following description of certain embodiments constructed in accordance with the disclosure and the accompanying drawing figures and claims.

DETAILED DESCRIPTION OF CERTAIN EMBODIMENTS OF THE DISCLOSURE

The present disclosure is directed to an apparatus and method for measuring the flow rate and mass of black powder contaminants inside natural gas pipelines in a laboratory (non-field) setting. Embodiments of the apparatus comprise an inlet section, a plenum chamber and a plurality of test sections. The main function of the inlet section is to deliver the test gas into the plenum chamber. The plenum chamber is an enclosure that facilitate a steady gas flow condition from the inlet section to a plurality of test sections. Each test section includes an outlet conduit divided into longitudinal sections referred to as "spools" herein. In some embodiments, the sections comprise an inlet spool, particle generation spool, filtration/screening spool and exit/collection spool.

The test gas from the plenum enters a given test section through the inlet spool. The purpose of particle generation spool is to generate "black powder" particles in a laboratory setting under simulated field conditions. To facilitate this, the particle generation spool in each test section is surrounded by a jacket in which cooling fluid is circulated, causing water condensation with corrosive components from the test gas. Since black powder particles are small enough to pass through most process filters, a filtration spool with membrane media is utilized for screening/filtering the black powder particles. The filtration spool can be a single section with multiple filtration elements or separate sections with a single filtration element. The membranes are placed in sequence from largest pore size to the smallest pore size such that the largest black powder particles get entrapped in the largest pore size membrane allowing smaller particle sizes to travel downstream to be captured by the smaller pore sizes membranes. Pressure drops across the filtration spool are monitored to determine a gas volume flow rate. The rate of black powder formation depends on the water condensation rate which can be controlled via differential between the gas temperature and temperature of the fluid in the cooling jacket. The composition of black powder can be controlled by controlling the composition of the gas blend input via the inlet section (e.g., different ratios of $CO_2$, $H_2S$).

In operation, once a desired thickness of black powder is formed, the corrosion process is stopped by discontinuing the flow of the test gas. The filtration spool and the collection spool are then connected to the particle generation spool. Dry nitrogen gas is allowed to flow once through the plenum chamber and its volume is measured by a flow meter at the exit of each piping branch. The velocity in each test section is determined according to the mass conservation (continuity) equation. Target velocities are between 4 to 60 m/s to mimic typical flow velocities in gas pipelines. The flowing nitrogen gas dislodges black powder particles from the internal surfaces of the particle generation spools carrying them through downstream spools. The filter membranes are then removed and weighted. The difference between initial and final weight divided by the passed volume of nitrogen gas indicates the particle loading.

A main goal of the apparatus and method of the present disclosure is thus to provide essential laboratory data critical for the development of validated models that can accurately predict particle dislodgment and entrainment velocities for different particle sizes and types. This knowledge helps gas pipeline operators to optimize the design of the gas transportation pipelines and to take the appropriate measures to mitigate the consequences of moving black powder particles.

Figures 1, 4:
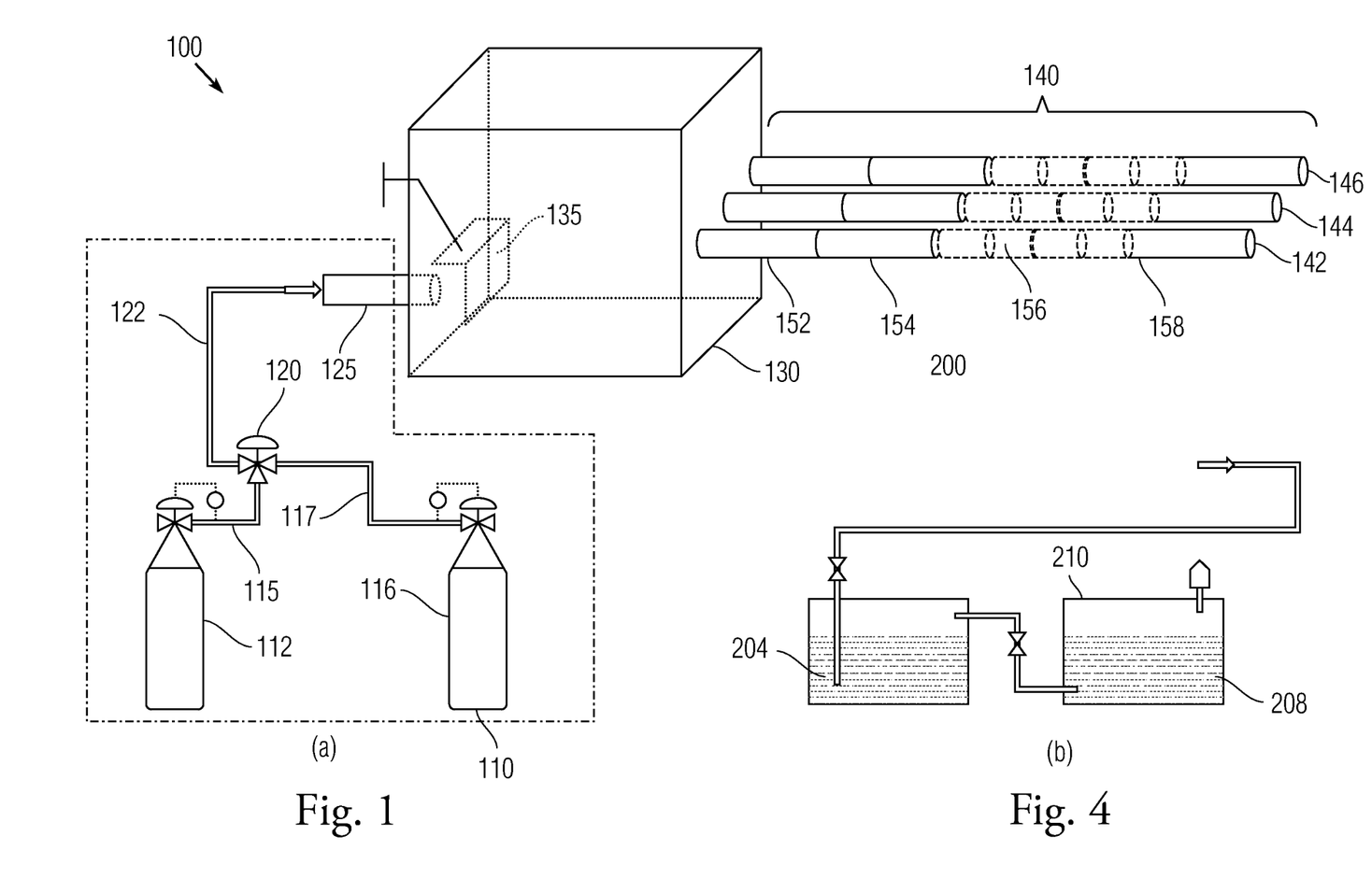
FIG. 1 is a schematic block diagram of an apparatus for measuring the flow and loading of black powder contaminants inside natural gas pipelines in a laboratory (non-field) setting according to an embodiment of the present disclosure.
FIG. 4 is a schematic diagram of a scrubber arrangement for treating test gas according to an embodiment of the present disclosure.

FIG. 1 is a schematic block diagram of an embodiment of an apparatus for measuring the flow rate and mass of black powder contaminants inside a pipeline structure. The apparatus 100 includes three sections: an inlet section 110, a plenum chamber 130 (hereinafter "plenum") and a test portion 140 that comprises a plurality of distinct test sections.

The inlet section 110 includes a first gas source 112, which can be implemented as a gas cylinder having an outlet port with an electronically controllable outlet valve via which the amount of gas delivered by the first gas source can be regulated. The first gas source can provide a test gas with a predetermined composition and pressure. The test gas is pre-selected moisture-staturated corrosive gas blend that is designed to cause the generation of black powder particles in test pipelines. The blend of the test gas can include nitrogen or methane mixed with $H_2S$ and/or $CO_2$ Oxygen ($O_2$) can also be included as a component of the test gas. The inlet section also includes a second gas source 116 having an electronically controllable outlet valve. In the embodiment depicted, the second gas source 116 contains and delivers dry nitrogen gas. The outlet valve of the first gas source 112 is coupled to a first conduit 115 and the outlet of the second gas source is coupled to a second conduit 117. The first conduit 115 leads downstream to a first port of a 3-way valve 120, and the second conduit 117 leads downstream to a second port of the 3-way valve 120. The 3-way valve is electronically controllable to block or permit flow from either conduit 115 or conduit 117 to flow through to an output port of the valve to an output conduit 122. In this manner, the 3-way valve is configurable to deliver test gas only, nitrogen gas only, a set combination (ratio) of test gas and nitrogen, or no gas at all through to the output conduit 122.

The conduit 112 is coupled at a downstream end to an inlet pipe 125 which extends into the plenum 130. The inlet pipe can be made of any material (metallic or non-metallic) but is preferably non-metallic. The main function of the inlet pipe is to act as a conduit to deliver the test gas into the plenum 130.

The plenum 130 is an enclosure which can have any shape such as rectangular or cylindrical and can be made of either metallic or non-metallic material but is preferably also made of non-metallic material to avoid affecting the test results. The size of the plenum can range for example, from 0.002 to 0.035 $m^3$ in volume, but is not necessarily limited to this range. The chamber is designed to be large enough to facilitate a steady flow of gas the test sections as described below. Affixed to the wall of the plenum 130 is an inlet plate 135 fixed that is coupled to the incoming inlet pipe 125. The inlet plate 135 acts as a momentum breaker by slowing down the incoming test gas stream and helps to distribute the incoming gas uniformly inside the chamber of the plenum. This provides for a steady gas flow to the test sections.

As noted above, the test portion comprises a plurality of test sections 142, 144, 146 formed as outlet pipes of cylindrical shape but other shapes can be used. Each of the test sections 142, 144, 146 extend outwardly from a wall of the plenum (other than the wall on which the inlet plate is affixed). The test sections are preferably arranged horizontally to avoid gravitational effects upon gas flow. While the embodiment of FIG. 1 depicts three test sections 142, 144, 146, the test portion can include a larger number of test sections, e.g., 4, 5, etc. Furthermore, while test sections 142, 144, 146 are all shown coupled to the same wall of the plenum 130, the test sections can be mounted on different walls from each other. In some embodiments, including the embodiment shown, the test sections 142, 144, 146 are geometrically similar but have different internal diameters. The different pipe internal diameters produce different gas velocities in each test section and enable more thorough testing. In addition, test sections 142, 144, 146 can include reducers or expanders to change the internal diameter along various parts of the length of the test sections. These elements enable different velocities for the same gas flow rate to be generated, and hence provide additional data points.

Figure 2:
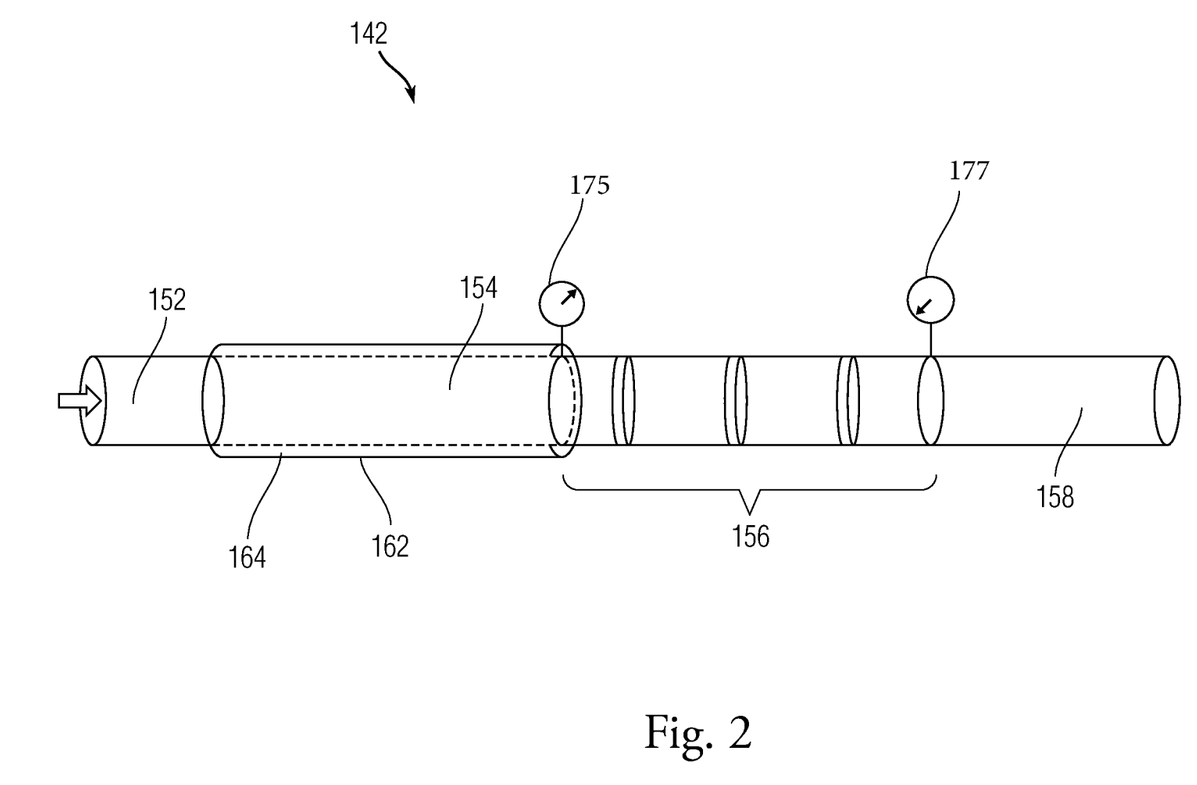
FIG. 2 is a schematic block diagram of a test section of an apparatus for measuring the flow and loading of black powder contaminant according to an embodiment of the present disclosure.

Reference is now made to FIG. 2 which is a block diagram of a single test section 142 according to an embodiment of the present disclosure. The description of test section 142 should be understood to equally describe the others of the plurality of test sections 144, 146, subject to differences between the test sections described herein. Test section 142 includes a plurality of longitudinal segments arranged in series. The segments are referred to as spools. In the embodiment depicted in FIG. 2, there are four (4) spools: an inlet spool 152, a particle generation spool 154, a filtration spool 156 and a collection spool 158. The spools of the test section 152, 154, 156, 158 are coupled mechanically via threads, flanges or other mechanisms known to those of ordinary skill in the art. In some implementations, the inlet spool 152 is permanently mounted connected to the plenum 130, which the other spools 154, 156, 158 can be removed and replaced by unfastening the mechanical couplings.

The particle generation spool 154 is intended to simulate black powder formation in sales gas pipelines from corrosion processes caused by condensation of water moisture and corrosive gases ($H_2S$, $CO_2$ and $O_2$) dissolved in the condensed water moisture film. According to this function, the particle generation spool 154 can be made of carbon steel at grades that match the material as sales gas pipelines. Using the same material ensure that similar corrosion processes occur in the particle generation spool as would occur in sales gas pipelines in terms of mechanism and rates. In some embodiments, the particle generation spool 154 is covered with a jacket 162, which can be made of steel. Between the jacket and the outer surface of the particle generation spool 154 there is a narrow annulus 164 in which a cooling fluid (for example, water) can be circulated with a controlled flow rate and temperature. The temperature of the cooling fluid is controlled via a cooling system and the fluid can circulated in a closed loop using a circulation pump. The circulation of the cooling fluid assists in condensing water in test gases onto the internal walls of the particle generation spool. The condensation helps initiate and promote black powder formation on the inner walls of the particle generation spool 154. The flow rate and temperature of the cooling liquid can be controlled electronically by a control device (e.g., process, electronic control unit, computing device) (not shown) to produce a target water condensation and black powder formation rate.

Figure 3A:
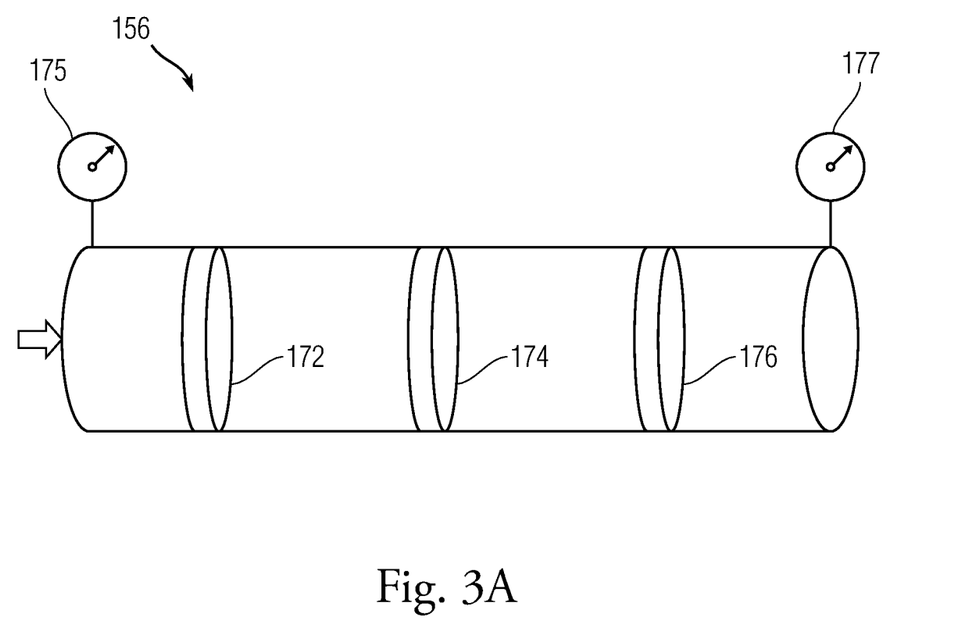
FIG. 3A is a schematic diagram of an embodiment of a filtration spool according to the present disclosure.
Figure 3B:
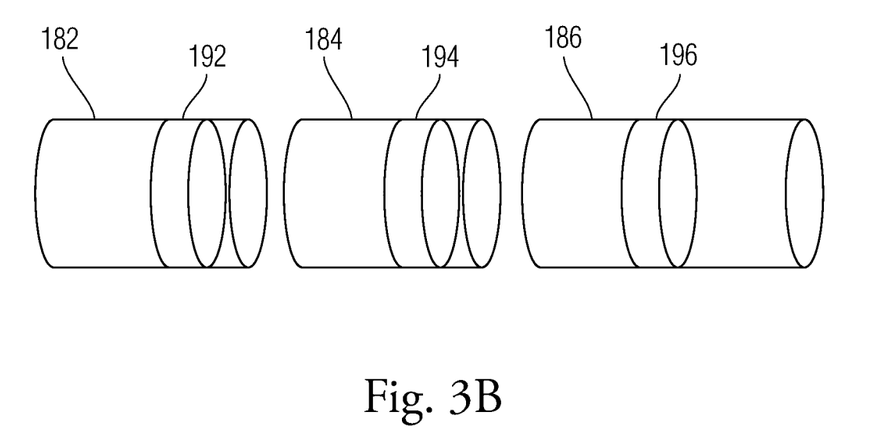
FIG. 3B is a schematic diagram of another embodiment of a filtration spool according to the present disclosure.

The filtration spool 156 includes membrane media used to filter and/or screen black powder particles generated in the particle generation spool 154. The filtration spool 156 can be made of either metallic or non-metallic materials. In some embodiments, the filtration spool 156 is formed as a single with a plurality of filtration membrane elements. The filtration spool 156 can alternatively be formed of smaller sections, each having a membrane element, and then mechanically coupled. In the embodiment shown in FIG. 3, the filtration spool 156 includes three membrane elements 172, 174, 176. In an alternative embodiment, shown in FIG. 3B, a filtration spool 180 is formed of three distinct segments 182, 184, 186, each having a respective membrane element 192, 194, 196 for particle filtration. Segments 182, 184, 186 can be threaded, flanged or have other mechanical features that allow the segments to be sealingly coupled. The membranes can be made of a polymeric material with appropriate pore sizes ranging, for example, from 1 to 100 microns.

Within the filtration spool 156, the membrane elements, e.g., 172, 174, 176 can be placed in sequence from largest pore size (closest to the particles generation spool exit end) to the smallest pore size (furthest from the particles generation spool). In this arrangement, the largest black powder particles get entrapped in the largest pore size membrane allowing smaller particle sizes to travel downstream to be captured by the smaller pore sizes membranes. Pressure gauges or transducers 175, 177 can be coupled across the filtration spool 156 to measure pressure drops across the spool. The pressure drops are indicative of any blockages of the filtration elements.

The collection spool 158 provides an exit outlet for the gases and provides access for the materials accumulated in the filtration spool to be collected. The exit spool can be connected to a collection pouch to reduce pollution in the working area.

The apparatus 100 as a whole comprises an open circuit arrangement in which test gas flows once through without circulation from the inlet section, through the plenum and into the test sections. Corrosion is expected to take place only at the internal surfaces of the particle generation spools 154 that are exposed to the water-containing corrosive test gas. At the end of the test sections, the volume flow rate of the gas through the apparatus is measured.

However, during initial operation of the apparatus 100 in which test gas is initially flowed through and corrosion builds up in the particle generation spool 154, the filtration spool 156 and collection spool 158 are not connected to the particle generation spool. Rather, as shown in FIG. 4, the exit end of the particle generation spool can be coupled to a scrubber apparatus 200. The scrubber apparatus can include a number of tanks 204, 208 in series filled with components which react with and remove any hydrogen sulfide $H_2S$ that might be present in the test gas before it is released via a vent 210 into the ambient environment.

During this initial stage, water in the test gas condenses on the internal surfaces of the particle generation spool 154 producing black powder corrosion. The rate at which black powder is formed depends on the water condensation rate. The condensation rate, in turn, can be controlled via the temperature difference ($\Delta T$) between the gas temperature and cold temperature in the annulus set by the circulating cooling fluid. The composition of black powder can be controlled by controlling the composition of the blend gas with following governing relations: when the ratio of $CO_2$ to $H_2S$ is less than 20, iron sulfide is the main corrosion product; when the ratio of $CO_2$ to $H_2S$ is between 20 and 500, there is a mixed regime in which both iron sulfide and iron carbonate are produced; when the ratio of $CO_2$ to $H_2S$ is greater than 500, iron carbonate is the main corrosion product. Alternatively, when oxygen is added, even in small amounts in the ppm range, the reactivity of oxygen dominates, and the corrosion product will mainly be iron oxides $Fe_3O_4$ and FeOOH.

Once a targeted thickness of black powder layer is formed, which can be detected using various sensors, the corrosion process is stopped by stopping the flow of the test gas. The second stage of the process now commences, and the filtration spool 156 and collection spool 158 are now connected to the particle generation spool 154. The target thickness typically ranges between 5 to 500 microns. The control valve 120 of the inlet section is switched so that dry nitrogen gas from the second gas source 116 is allowed to flow through into the plenum 130 and into the test sections 142, 144, 146. The dry nitrogen gas does not produce corrosion but dislodges and entrains black powder particles formed during the initial process. The volume of the nitrogen gas flow is measured by a flow meter at the exit of the collection spool 158 of each test section. The flow velocity in each test section is determined according to the mass conservation (continuity) equation and is based on both the gas flow rate and the test section diameter. A target gas velocity is achieved by delivering an adequate flow rate in the test section and monitoring the reading of the flow meter at the end of each test section to confirm that the target flow rate value has been reached.

In some embodiments, the test sections have different diameters to develop different flow velocities in each section. Typically, target velocities are between 4 to 60 m/s to mimic typical flow velocities in gas pipelines. The flowing nitrogen gas dislodges black powder particles from the internal surfaces of the particles' generation spool carrying them through downstream spools. Membrane elements of the filtration spool are then removed and weighted to the nearest 0.00001 g. The difference between initial and final weight divided by the passed volume of nitrogen gas indicates the particle loading. The captured black powder particles are also analyzed using laser diffraction or other methods to obtain particle size distributions captured in each membrane element.

The following discussion describes the theoretical foundation upon which the flow rate measurements are based. Assuming isothermal steady flow of a perfect gas in the test sections, the pressure drop across any one of them is due to friction and secondary losses. The friction losses can be computed from the Darcy equation:

$$h_L = f \frac{L}{D} \frac{v^2}{2g} \tag{1}$$

In the above equation (1) In which f is a friction factor, L and D are the test section length and diameter respectively, and v is the average gas velocity in the test section. If the Reynolds number $$(Re = \frac{\rho v D}{\mu})$$

is less than 2000 the flow is considered to be laminar and the friction coefficient can be calculated as $$f = \frac{64}{Re}.$$

If Re is greater than 3000, the flow is considered to turbulent and the friction factor can be calculated iteratively from Colebrook formula:

$$\frac{1}{\sqrt{f}} = -2.0 \log\left(\frac{\varepsilon/D}{3.7} + \frac{2.51}{Re\sqrt{f}}\right) \tag{2}$$

Or from Swamee & Jian (1976) for Reynolds number in the range of $5000 \leq Re \leq 10^8$ & $10^{-6} \leq \varepsilon/D \leq 0.05$, the friction factor is calculated as:

$$f = 0.25\left[\log\left(\frac{\varepsilon/D}{3.7} + \frac{5.74}{Re^{0.9}}\right)\right]^{-2} \tag{3}$$

In the above equation (3) above, $\varepsilon$ is the roughness of the internal surface of the test section which depends on the test section material. For implementations in which there are valves, fittings, bends and other components including filtration elements that can cause considerable changes in flow patterns, secondary losses are accounted for by a loss coefficient, $K_L$, for each class and size of a particular component which is given by:

$$h_L = K_L \frac{v^2}{2g} \quad (4)$$

in which values of $K_L$ can be found from the technical literature or manufacturer's manuals of each corresponding component.

From equations (1)-(4), the total losses can be computed from the following equation:

$$h_L = \sum_i \left( f_i \frac{L_i}{D_i} + K_{Li} \right) \frac{v_i^2}{2g} \quad (5)$$

The pressure drop across any one of the test sections is then calculated using the following equation:

$$\Delta p = p_0 - p_{atm} = \rho g h_L \quad (6)$$

and the flow velocity is calculated from:

$$v_i = \sqrt{\frac{2\Delta p}{\rho \sum_i \left( f_i \frac{L_i}{D_i} + K_{Li} \right)}} \quad (7)$$

Equations (3) and (7) are solved iteratively to get the average velocity in individual test sections. For a steady flow process, the total volume flow rate is the sum of the flow rates in each branch:

$$\dot{Q}_{total} = \sum_i \left( \frac{\pi}{4} D_i^2 v_i \right) \quad (8)$$

It is understood that a computing device or processor can be configured using program instructions and parameter inputs to compute the above equations as would be known to those of skill in the art.

It is noted that for the targeted velocity range the corresponding pressure drop is typically small enough that density variation can assumed to be minimal and hence the flow can be considered incompressible. Using the above equations and the velocities upper and lower limits (60 m/s and 4 m/s), the target diameters for the spools can be set to range from 0.5 inches to 2 inches, although the diameters are not limited to this range.

The apparatus and method of the present disclosure is particularly significant due to the increased demand for natural gas and the associated increase in the sales gas pipeline network. These developments imply a higher likelihood and larger magnitude of black powder generation (due to larger pipeline surface area). Laboratory determination of the dislodgment and entrainment velocities of solid particles, and, in turn, the modeling and prediction of such velocities in actual pipeline networks is critical to the design of successful black powder mitigation strategies such as optimizing the locations of filter installations, controlling operating conditions to minimize black powder dislodgment, improving the design of filters and valves to avoid erosion, etc.

In contrast to conventional apparatus and methods, which are all field-based online-measurement systems, the laboratory apparatus described in the present disclose permits control over the type, rate and size of black powder particles generated. This allows a sufficient quality and quantity of data as inputs to validate computational models to be obtained. Furthermore, the disclosed apparatus avoids health, safety and environment (HS&E) concerns and costs associated with hot tapping of gas pipelines in the field to measure solid particle gas loading and particle size. The laboratory apparatus and method also 1 provides a reliable way to mimic black powder and its separation behavior in a test loop which will facilitate qualification and performance verification of new filtration technologies.

Additional applications of the disclosed apparatus and method include qualifying filtration technologies and designs for qualification and performance, providing a reliable foundation for the development and validation of computational models that can improve the prediction of dislodgment, movement and deposition of black powder particles, solid particle loading in gas, and erosion of components caused by dislodged black powder.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An apparatus for measuring black powder dislodgment and entrainment velocities comprising:
   an inlet section including a first gas source having a test gas, a second source having an additional gas, and an inlet pipe coupled to both the first and second gas sources;
   a plenum having an inlet plate coupled to the inlet pipe for receiving delivery of at least one of the test gas and the additional gas and distributing the received gas into a steady flow; and
   a plurality of test sections coupled to and extending from the plenum, each of the test sections including a particle generation spool at which black powder is generated from a flow of the test gas via a condensation process, and a filtration spool positioned downstream from the particle generation spool having at least one membrane element for filtering out black powder from the flow of the test gas, the filtration spool also having pressure gauges positioned at opposite ends of the spool from which black powder dislodgment and entrainment velocities can be determined.

2. The apparatus of claim 1, wherein the test gas contains a) at least one of nitrogen and methane and b) at least one of $H_2S$ and $CO_2$.

3. The apparatus of claim 2, wherein the test gas further contains oxygen.

4. The apparatus of claim 1, wherein the additional gas comprises nitrogen.

5. The apparatus of claim 1, further comprising an electronically controllable 3-way valve positioned coupled to outlets of the first and second gas sources and configured to block or permit delivery of gas from either the first or second gas sources.

6. The apparatus of claim 1, wherein each of the plurality of test sections further comprise an inlet spool permanently affixed to the plenum and coupled between the plenum and the particle generation spool.

7. The apparatus of claim 6, wherein the particle generation spool and filtration spool in each of the plurality of test sections are removably coupled to the inlet spool.

8. The apparatus of claim 1, wherein each of the plurality of test sections further comprise a collection spool positioned at an outlet of the filtration spool.

9. The apparatus of claim 1, wherein the plurality of test sections comprises at least three test sections.

10. The apparatus of claim 1, wherein the particle generation spool is formed as a pipe made of a carbon steel material and having internal and external cylindrical surface.

11. The apparatus of claim 10, further comprising a sleeve positioned surrounding the external surface of the particle generation spool of each of the plurality of test sections and a cooling fluid that circulates in an annulus between the sleeve and the particle generation spool, the cooling fluid serving to cool the material of the particle generation spool, inducing water condensation and corrosion on the internal surface of the particle generation spool from reaction between the water condensation, the steel material and the test gas.

12. The apparatus of claim 1, further comprising a scrubber arrangement that can be and removably coupled to an outlet of the particle generation spool of a test section, the scrubber arrangement including components for removing hydrogen sulfide from the test gas before venting to a surrounding environment.

13. The apparatus of claim 1, wherein each of the plurality of test sections is formed as a pipe with a differing diameter from others of the plurality of test sections.

14. The apparatus of claim 1, wherein the each of the at least one membrane element of the filtration spool of the plurality of test sections has a different pore size.

15. A method of measuring black powder dislodgment and entrainment velocities comprising:
   delivering a flow of test gas to a plurality of test section pipes in a steady manner to each of the test sections, the test sections each having a particle generation spool;
   generating black powder in the particle generation spool via a flow of the test gas via a condensation process;
   stopping flow of the test gas and delivering flow of an additional gas that does not produce corrosion, the flow of the additional gas causing dislodgement and entrainment of the black powder previously generated;
   filtering the black powder particles in a filtration spool coupled downstream of the particle generation spool in each test section, the filtration spool having at least two membrane elements positioned in series along a length of the spool;
   measuring pressure difference across ends of the filtration spool;
   removing and weighing the membrane elements of each filtration spool; and
   determining, using a configured processor, black powder particle velocity and mass flow from the measured pressure difference across the filtration and weights of the membrane elements.

16. The method of claim 15, further comprising cooling the particle generation spool to promote corrosive condensation of water on an internal surface of the particle generation spool in each test section.

17. The method of claim 15, further comprising varying an internal diameter of each of the plurality of test section pipes, wherein the internal diameter has an effect upon black powder velocity and mass flow.

18. The method of claim 15, further comprising varying a pore size of the at least two membranes the filtration spool of each of the plurality of test section pipes, wherein the membrane pore size has an effect upon black powder velocity and mass flow.

19. The method of claim 15, wherein the plurality of test section pipes includes at least three test section pipes.

20. The method of claim 15, wherein the flow of test gas is delivered to the plurality of test section pipes via a plenum.

* * * * *